Reissued May 18, 1937

Re. 20,370

UNITED STATES PATENT OFFICE 20,370

PROCESS FOR THE PRODUCTION OF ETHYLENE OXIDE

Theodore Emile Lefort, Paris, France, assignor, by mesne assignments, to Carbide and Carbon Chemicals Corporation, New York, N. Y., a corporation of New York No Drawing. Original No. 1,998,878, dated April 23, 1935, Serial No. 600,578, March 22, 1932. Application for reissue September 25, 1936, Serial No. 102,613. In France March 27, 1931

9 Claims. (Cl. 260—54)

This invention provides a specific and novel process for making ethylene oxide. It essentially consists in causing ethylene to combine directly with molecular oxygen at temperatures of about 150° to about 400° C. in the presence of a surface catalyst which favors the oxidation of ethylene to ethylene oxide under these conditions. The process can be carried out at atmospheric pressure, and it may also be conducted at pressures above or below atmospheric pressure.

This process is characterized by an entirely unique reaction in which the direct addition of a single oxygen atom to the ethylene molecule occurs without the formation of significant amounts of other oxygenated compounds such as aldehydes. This novel reaction may be expressed as:

$$2CH_2{=}CH_2+O_2 \longrightarrow 2CH_2{-}CH_2 \quad (\text{O bridge})$$

and it is accompanied by complete oxidation of some of the ethylene to give carbon dioxide and water according to the equation:

$$CH_2{=}CH_2+3O_2 \rightarrow 2CO_2+2H_2O$$

Ethylene from any desired source may be used, including that obtained from coke oven gas, hydrogenation of acetylene, or dehydration of ethyl alcohol. The oxygen can be the oxygen of the air, and can conveniently be mixed with the ethylene prior to the reaction.

The oxidation of ethylene takes place with a giving off of heat, and it is, of course, desirable to maintain the temperature of the zone of reaction within the range specified. This can be facilitated by suitable dilution of the reaction gases, such as that accomplished by the use of air as the source of oxygen, and some water or carbon dioxide in addition to that formed can be admitted to the mixture in the reaction zone if desired. Hydrogen may be similarly added.

The process can be conveniently conducted by passing a mixture containing air and ethylene through a tube, for example, of silica or of a material capable of withstanding high pressures, within which is placed such a surface catalyst as one composed of silver in finely divided form, and which may be disposed within the tube on a supporting material, or in other known ways. The temperature of the reaction zone is maintained between about 150° and about 400° C., for example, at about 200° C., and the issuing products from the tube contain ethylene oxide, carbon dioxide and water without objectionable aldehydes. The ethylene oxide can be recovered in any suitable way, preferably in liquid form by condensation or solution.

The surface catalyst is preferably silver as stated, but other metals such as bismuth and antimony may be used. Likewise oxides of these metals or mixtures containing these metals or their oxides may be used. Experiments have also indicated that the catalyst may be silver activated by the addition of small amounts of gold or copper or iron.

In any case, the ethylene and oxygen are thus reacted simultaneously at the temperatures set forth in the presence of a surface catalyst and of water, and the process is conducted to produce ethylene oxide as a direct product in substantial and economic amount. The ethylene oxide can be recovered by known methods, and it may be further reacted to form ethylene glycol or derivatives of ethylene glycol.

I claim:

1. A process for the production of ethylene oxide, consisting in subjecting ethylene to the simultaneous action of oxygen and water at a temperature between 150° and 400° C. in the presence of a catalyst composed of silver activated by small quantities of a metal selected from a group consisting of gold, copper and iron.

2. A process for the production of ethylene oxide, consisting in subjecting ethylene to the simultaneous action of the oxygen and water at a temperature between 150° and 400° C. in the presence of a catalyst composed of a mixture of silver, gold, copper and iron.

3. A process for the production of ethylene oxide, consisting in subjecting ethylene to the simultaneous action of oxygen and water at a temperature between 150° C. and 400° C. in the presence of a catalyst composed of a mixture of silver and gold.

4. A process for the production of ethylene oxide consisting in subjecting ethylene to the simultaneous action of oxygen and steam at a temperature between 150° and 400° C., and at a pressure below atmospheric pressure, in the presence of a catalyst composed of a metal selected from a group consisting of silver, gold, copper and iron, and in the presence of hydrogen in the proportion of 5 per cent of the total volume.

5. A process for the production of ethylene oxide consisting in subjecting ethylene to the simultaneous action of oxygen and steam at a pressure below atmospheric pressure, in the presence of a catalyst composed of a metal selected from a group consisting of silver, gold, copper and iron, and in the presence of hydrogen in the proportion of 5 per cent of the total volume, and of $CO_2$.

6. A process for the production of ethylene oxide consisting in subjecting ethylene to the simultaneous action of oxygen, steam and hydrogen at a temperature between 150° and 400° C. in the presence of a catalyst composed of silver activated with small quantities of gold.

7. A process for the production of ethylene oxide consisting in subjecting ethylene to the simultaneous action of oxygen, steam and hydrogen at a temperature between 150° and 400° C. in the presence of a catalyst composed of silver activated with small quantities of a mixture of gold and copper.

8. The process of making ethylene oxide by the direct chemical combination of oxygen with ethylene in the proportions of one atom of oxygen to one molecule of ethylene, which comprises forming a mixture containing ethylene and molecular oxygen and conducting said mixture through a confined reaction zone which is maintained at an elevated temperature; controlling said temperature to maintain said mixture in said zone at a temperature between about 150° and about 400° C.; subjecting said mixture in said zone at said elevated controlled temperature to intimate contact with an active surface catalyst of a material having the catalytic characteristics of silver which favors the direct oxidation of said ethylene in said mixture by said molecular oxygen to form oxidation products containing ethylene oxide in the presence of water and which does not favor the existence in said products of substantial amounts of aldehydes; correlating the passage of said mixture through said reaction zone in the presence of said catalyst and the controlled elevated temperature of said mixture and said catalyst to effect said oxidation of said ethylene directly to form substantial amounts of ethylene oxide; and thereafter recovering ethylene oxide-containing product in liquid form.

9. The process of making ethylene oxide by the direct chemical combination of oxygen with ethylene in the proportions of one atom of oxygen to one molecule of ethylene, which comprises forming a mixture containing ethylene and molecular oxygen and a heat-absorbing diluent and conducting said mixture through a confined reaction zone which is maintained at an elevated temperature; controlling said temperature to maintain said mixture in said zone at a temperature between about 150° and about 400° C.; subjecting said mixture at said elevated controlled temperature to intimate contact with an active surface catalyst material composed essentially of silver which favors the direct oxidation of said ethylene in said mixture by said molecular oxygen to form oxidation products containing ethylene oxide in the presence of water and which does not favor the existence in said products of substantial amounts of aldehydes; correlating the passage of said mixture through said reaction zone in the presence of said catalyst and the controlled elevated temperature of said mixture and said catalyst to effect said oxidation of said ethylene directly to form substantial amounts of ethylene oxide; and thereafter separating ethylene oxide from the products of oxidation.

THEODORE EMILE LEFORT.

DISCLAIMER

Re. 20,370.—*Theodore Emile Lefort*, Paris, France. PROCESS FOR THE PRODUCTION OF ETHYLENE OXIDE. Patent dated May 18, 1937. Disclaimer filed May 14, 1942, by the assignee, *Carbide and Carbon Chemicals Corporation*.

Hereby disclaims claims 8 and 9 of said patent.

[*Official Gazette June 16, 1942.*]